United States Patent Office 3,223,447
Patented Dec. 14, 1965

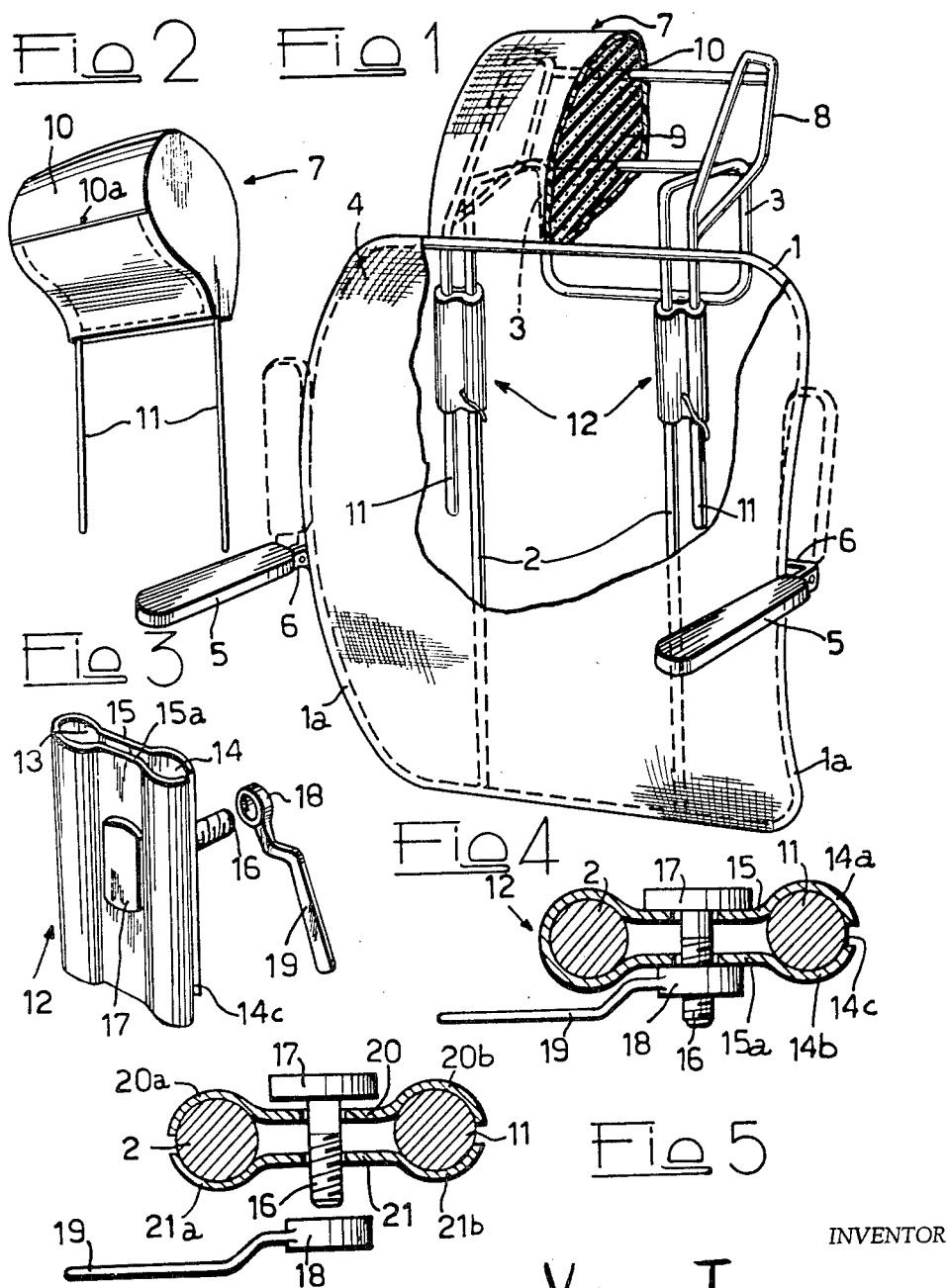

3,223,447
BACK REST ATTACHMENT FOR MOTOR
VEHICLE SEATS
Vittorio Terracini, Turin, Italy, assignor to Tervit
Gestione Brevetti S.r.l., Turin, Italy
Filed Oct. 20, 1964, Ser. No. 405,199
1 Claim. (Cl. 297—397)

This invention relates to back rest attachments for the back of vehicle seats, of the type comprising a rigid frame forming a shaped contour, provided with a pair of rods securely fixed to the frame and with a wide-meshed netting or similar structure stretched between the frame sufficiently to support the occupant's back.

Such back rests are useful in assisting the vehicle occupant in assuming a straight position with the back independently of the configuration of the seat back which is upholstered and yields to the weight, whereby the occupant may be forced to take a harmful, distorted or contracted position.

With the occupant's back in a straight position the field of vision is widened, which is particularly useful in driving a vehicle.

A further advantage of back rests is that air circulation is enhanced by the surface made of network or wide-meshed fabric, which is normally prevented by the upholstery and lining of vehicle seat backs.

Seat backs which require an erect position of the occupant's back soon cause fatigue which is very bothersome during long drives. It was ascertained in practice that this drawback will not occur with seats provided with arm rests for support of the elbows which partly relieves the strain from the weight of the trunk and upper limbs.

In order to obviate the above drawbacks this invention provides a back rest of the type referred to above, which allows the seat occupants to take a restful position which is tolerable during a long journey.

A further object of this invention is to provide a back rest of the type referred to above, useful in protecting the seat occupant against injury due to whiplash collision.

With the above objects in view this invention provides a back rest of the type referred to above provided with two tiltable arm rests hinged to the sides of the frame, movable between two end positions in which they are tilted along the side walls of the frame and lowered to a horizontal position, respectively, to afford a support for the arms of the occupant, a head rest being provided for attachment to the rear support frame which is adjustable in height.

Further characteristic features and advantages of this invention will be understood from the following detailed description referring to the accompanying drawings given by way of example, and wherein:

FIGURE 1 is a perspective view of an improved back rest;

FIGURE 2 is a perspective rear view of the head rest;

FIGURE 3 is a perspective detail view of the attachment means for the head rest and FIGURE 4 is a cross sectional view on line IV—IV of FIGURE 3;

FIGURE 5 shows an embodiment alternative to that of FIGURE 4.

The frame 1 of the back rest is of conventional shape and is supported by two rear rods 2 interconnecting its top and bottom portions.

The embodiment shown provides a back rest with means for suspending it from the back of the seat of the vehicle, comprising a pair of hooks 3 formed by an extension of the rods 2.

However, the invention may also be used with back rests having no such suspension means, but instead attached by means of resilient straps to the back of the vehicle seat.

A network or wide-meshed fabric 4 is stretched across the frame 1 and acts as the support for the back of the person.

The side portions 1a of the frame 1 have articulated thereto two arm rests 5 which can be swung between two end positions. In the embodiment shown the arm rests are hinged to two straps 6 welded to the side portions 1a of the frame 1. With the hinge means for the arm rests 5, the latter can be lowered to a horizontal position in which they support the arms of the occupant or the arm rests can be tilted to a substantially vertical position shown in broken lines in FIGURE 1. The hinges are so arranged that the arm rests in their retracted position are situated towards the rear of the load-bearing surface of the back seat, so as to allow clearance for the body of the person stepping into and out of the car.

The back rest is provided with a head rest 7 comprising a metal frame 8 and a suitably shaped upholstery 9 and a covering 10. The frame 8 is provided with means for attachment to the frame 1 of the back rest and adjustment of its position as to height.

In the embodiment shown such attachment means comprise two rods 11 which are part of the head rest frame 8, and are adapted to be inserted into a sleeve member 12 secured to each of the rear rods 2 of the back rest frame.

As shown in FIGURE 3 the sleeve member 12 is formed with two parallel tubular receptacles 13, 14 spaced by intermediate pinched portions 15. One receptacle 13 envelops one rod 2 of the back rest frame, the other receptacle 14 slidably receives one rod 11 of the head rest frame 8. The sleeve member 12 is secured to the rods 2 of the back rest by crimping or by welding, the rods 11 of the head rest being freely slidable in the receptacles 14 of the sleeve member 12.

As shown in FIGURES 3 and 4, the receptacle 14 of the sleeve member 12 is formed with a longitudinal slot 14c, to act as a resilient clamp, having two concave jaws 14a, 14b said jaws are drawn towards each other by a screw 16 extending transversely of the sleeve, the screw 16 being provided with a head 17 and with a shank on which a nut 18 is threaded having fast therewith a hand lever 19.

By tightening the nut 18 on the screw 16 the two opposite sleeve member portions are drawn towards each other and clamp the receptacle 14 on the rod 11 therein.

Alternatively as shown in FIG. 5, the sleeve member 12a is made up of two separate symmetrical plates 20, 21 centrally interconnected by a clamping screw 16; 17 and a nut 18, 19.

The opposite side portions of plates 20, 21 are bent to form concave jaws 20a, 20b and 21a, 21b, which in assembled position form cylindrical seats for rods 2 and 11.

In addition to supporting the arms the above described back rest supports the head, whereby the person occupying the vehicle seat can relax completely and at the same time is protected against whiplash injury from the back.

The frame 8 is situated at the back of the head rest 7, the forward portion of which is exclusively made of upholstery 9, affording a comfortable and safe rest.

The head rest 7 can be easily removed from the back rest, when use is not required.

As shown in FIG. 2, the head rest 7 is provided at the rear with at least one pocket 10a formed in the covering 10 thereof. The pocket 10a may be used for depositing small articles, such as spectacles, cigarettes and the like.

What I claim is:

In a back rest attachment for motor vehicle seats, the combination comprising a rigid frame, substantially rectangular in plan, including two side members, a top member and a bottom member interconnected to each other, and a pair of rods extending between said top and bottom members intermediate said side members; a sheet of wide mesh fabric stretched between said top, bottom and side members; a pair of split sleeve clamp members each fixedly secured to a respective rod with the split sleeves extending substantially parallel to each other and to said rods; an upholstered head rest having embedded therein a frame including a pair of legs depending from said head rest in spaced substantially parallel relation substantially equal to the spacing of said split sleeves, for adjustable insertion through said split sleeves to disengageably mount said head rest on said back rest; and bolt and nut means operatively associated with each split sleeve clamp member to clamp said legs releasably in adjusted position in said split sleeve clamp members; said head rest being provided with a pocket formed in the covering of the rear side of said head rest.

References Cited by the Examiner

UNITED STATES PATENTS

| 1,529,231 | 3/1925 | Arnold | 248—226 |
| 2,056,479 | 10/1936 | Newman | 297—400 |
| 2,613,731 | 10/1952 | Roginski | 297—399 |
| 2,615,501 | 10/1952 | Neiborn | 297—403 |
| 2,632,497 | 3/1953 | Brady | 297—401 |
| 2,711,787 | 6/1955 | Hallowell et al. | 297—440 |
| 2,756,808 | 7/1956 | Eichorst | 297—230 |
| 2,835,311 | 5/1958 | Reeves et al. | 297—401 |
| 3,014,761 | 12/1961 | Otto | 297—230 |
| 3,035,865 | 5/1962 | Schirmer | 297—391 |

FRANK B. SHERRY, *Primary Examiner.*